April 26, 1960 WAY DONG WOO 2,934,746
INFORMATION SIGNAL PROCESSING APPARATUS
Filed Aug. 1, 1956 3 Sheets-Sheet 1
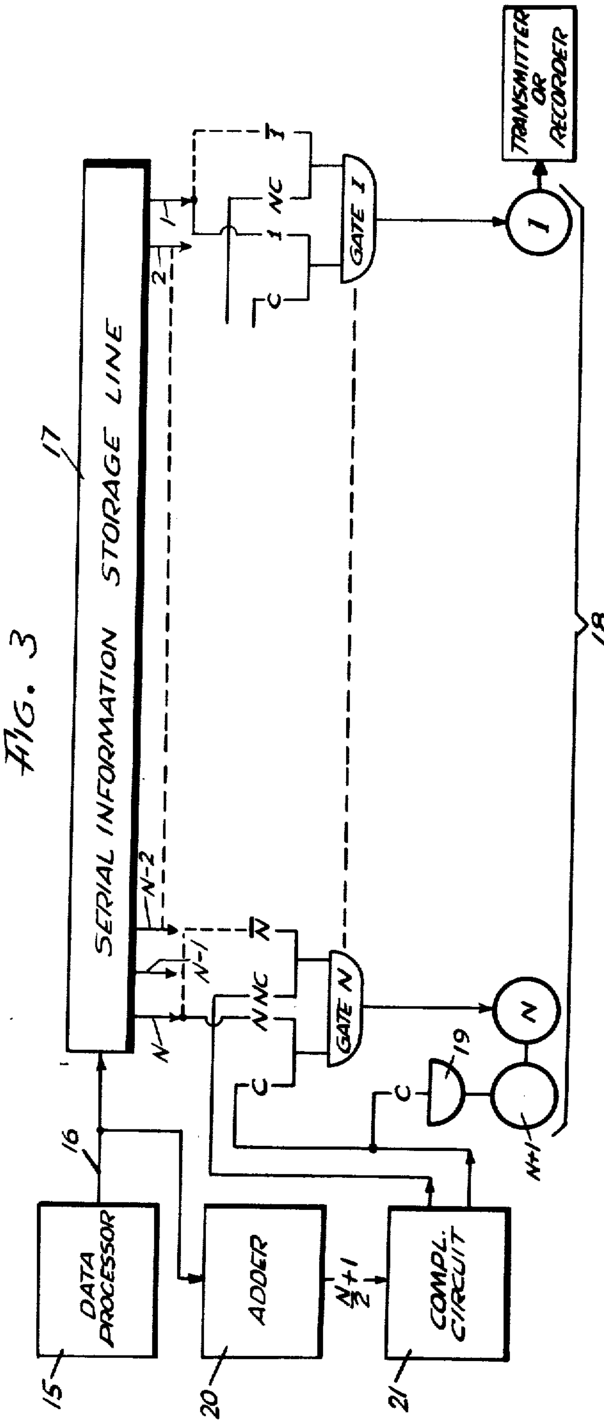
FIG. 3
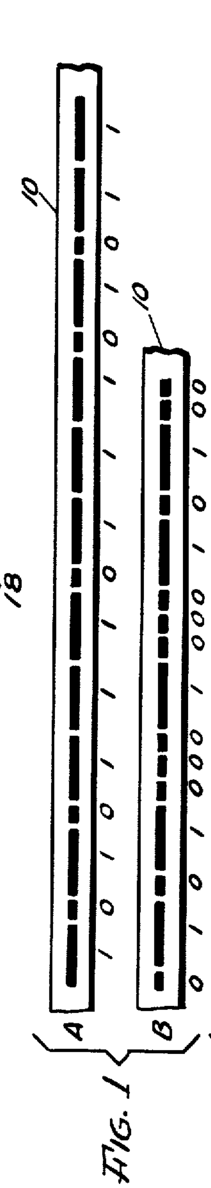
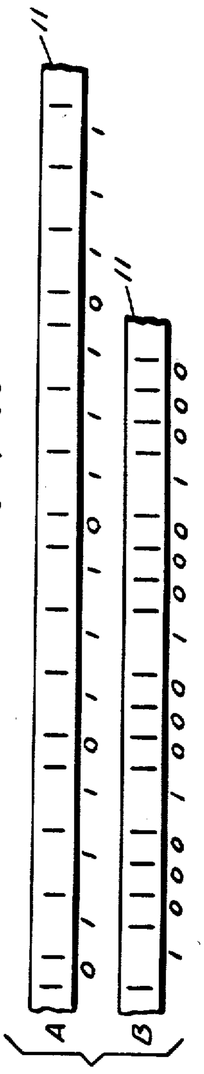
FIG. 1
FIG. 2
INVENTOR.
WAY DONG WOO
BY Henry L. Hanson
ATTORNEY April 26, 1960 WAY DONG WOO 2,934,746

INFORMATION SIGNAL PROCESSING APPARATUS

Filed Aug. 1, 1956 3 Sheets-Sheet 2

INVENTOR.
WAY DONG WOO
BY Henry L. Hanson
ATTORNEY

INVENTOR.
WAY DONG WOO
BY Henry L. Hanson
ATTORNEY

United States Patent Office 2,934,746

Patented Apr. 26, 1960

2,934,746

INFORMATION SIGNAL PROCESSING APPARATUS

Way Dong Woo, Newton Center, Mass., assignor, by mesne assignments, to Minneapolis-Honeywell Regulator Company, a corporation of Delaware Application August 1, 1956, Serial No. 601,448

18 Claims. (Cl. 340—174)

A general object of the present invention is to provide a new and improved information transfer apparatus. More specifically, the present invention is concerned with a new and improved information transfer apparatus which is characterized by its ability to increase the time and use efficiency of information transferred as well as reduce the amount of space required when the data is recorded on a record medium.

In data processing machines, such as electrical computers, telegraph systems, telephone systems, and the like, the information handled is frequently electronically represented in binary form due to the ease with which binary data may be electronically represented by "on-off," or "dot-dash" representations. As the binary representation frequently comprises designations of different time duration, it is possible that one piece of information having a certain number of binary bits will require a greater time to transfer than another piece of information having the same number of bits. For example, in a dot-dash type of binary representation where ten binary bits of information are considered, if the ten bits are each represented by a dash, the time length of the information will be at least twice as long as if the ten bits of information were represented by dots. It will be readily apparent that where a more efficient time use of a transmission circuit is required, the information must be represented by binary representations where more short time representations are present than long time representations.

It is accordingly a more specific object of the present invention to provide an apparatus for effecting a binary information transfer where the binary representations are selected so that there will be more short time representations present than long time representations in order to minimize the time length of any piece of information.

The foregoing object of the present invention is achieved by a novel electrical circuit which inspects the data to be transferred to determine if there is a predominance of one type of binary information with respect to the other. If the predominance indicates that the time length of the information is greater than necessary, the control circuit is effective to complement the information so that the time representations for each binary digit will be reversed to thereby decrease the length of the information to be transferred.

It is accordingly a more specific object of the present invention to provide a new and improved apparatus for complementing the information to be transferred when the complementing of the binary representations will shorten the time length of the information transferred.

The apparatus is also adapted for use in recording binary data where the representations used in the recording are of the time difference type. Thus, when data is to be recorded on a record medium, such as a record tape, the amount of record space required will be minimized if the binary bit representation is selected so that the particular binary bit which exceeds one half the total bits is represented by a representation of short distance compared to the representation of the other binary bit.

It is accordingly a further more specific object of the present invention to provide a new and improved apparatus for recording binary data which comprises complementing the information to be recorded when complementing will shorten the amount of space required for recording the data.

Another more specific object of the present invention is to provide a data complementing circuit for minimizing the time required for transferring data and incorporating with the data transferred an indicator indicating that the data has been complemented.

The information which is transferred may also be in forms other than digital form where the information is scanned and modified when the modification will produce an improved transmission characteristic. When the information is received, it is suitably remodified for use in its initial form.

Therefore, another object is to provide an information scanning apparatus which will modify the information transmitted when the modification will improve the transmission thereof.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Figure 1 is a showing of binary data record in the "dot-dash" form of representation;

Figure 2 shows a binary data record wherein the binary representations are a pulse position representation;

Figure 3 is a diagrammatic showing of a circuit incorporating the principles of the present invention;

Figure 4:
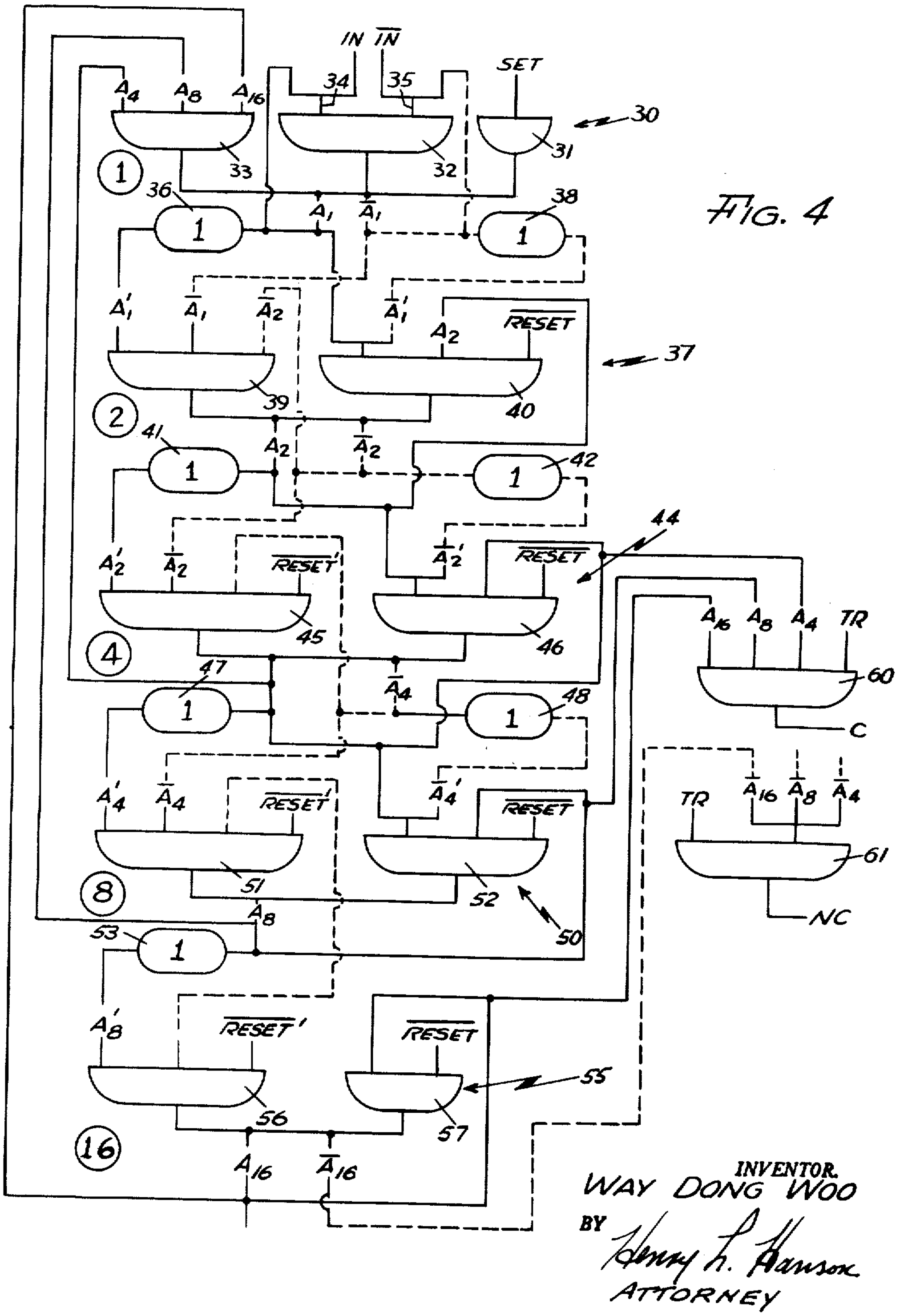
Figure 4 shows the diagrammatic arrangement of the adder and complementing circuit elements used in Figure 3.

Referring first to Figure 1, noting particularly the A section of Figure 1 there is shown a binary data record formed of a series of dashes and dots. The representation may be formed on a magnetic tape 10 or may be formed by suitable inking means or by punched holes on a suitable type of recording medium. It is assumed that the binary information in the A section of Figure 1 is in its normal form. As shown, there are eleven dashes designated by the long representations and five dots designated by the short representations indicating a total of sixteen binary digits or bits. It is assumed that the dashes represent binary "ones" and that the dots represent binary "zeroes." Since there are more dashes than dots, it will be readily apaprent that the length occupied by the binary information may be decerased if all of the dashes are made dots and the dots made dashes. This transfer of designation is referred to as the complementing of the information and a complement of the information in Figure 1A is shown in Figure 1B.

Referring to Figure 1B, it will be noted that there are now eleven dots and five dashes. It will be readily apparent that when complemented, the information shown in Figure 1A occupies a considerably reduced space as shown in Figure 1B.

It will be readily apparent that there is some optimum point at which complementing of the binary information should take place. If there are sixteen binary bits of which eight are dashes and eight are dots, it will be apparent that the complementing of the information will not result in any saving in time of transmission or in space of recording. However, if the number of dashes exceeds the number of dots by one, nine dashes out of sixteen in the present example, it then becomes economical from the time standpoint to complement the data so that it is now comprised of nine dots out of the total of sixteen. This may be stated in general terms in connection with any binary information having N binary bits. When there are $N/2+1$ long time length representations out of the total N binary bits, it becomes desirable to complement the information.

Figure 2 shows another form of binary information recording which again may be on magnetic tape, tape carrying an inked notation or a punched tape. In this form of recording there are a plurality of marks or indicia placed upon a tape 11 where the time or distance spacing between adjacent pulses is indicative of the particular binary data recorded. Thus, for example, the indicia having the closest distance therebetween may represent a binary zero. The adjacent indicia having the greatest distance therebetween may be used to designate a binary one.

As shown in Figure 2A, there are twelve binary ones and four binary zeroes. It will be readily apparent that with the excess of binary ones that the time length of the information may be decreased by complementing the same. This is shown in Figure 2B in the complemented form. In Figure 2B, there are now twelve binary zeroes and four binary ones. This figure also serves to indicate that time and space savings may be achieved complementing the binary information.

A representative circuit for complementing the information to be transferred is shown diagrammatically in Figure 3. Here there is shown a data processor 15 which may take any of several forms such as an electronic computer, a telegraphic system, a telephone system, and the like having an output which is to be transferred to a data transmitter or to a recorder. It is assumed that the data to be transferred is a series of zeroes and ones having been previously encoded in this manner by the data processor or some other means. The data processor 15 is adapted to serially transmit information on an output line 16 to a serial information storage line 17. The information storage line while having a serial input has a parallel output so that once the storage line has been filled, each of the storage positions in the line may be dropped out at a selected instant to another storage line. If there are N bits of information stored in the storage line 17, there must be N parallel output terminals on the line. The output of each of the bit positions of the storage line 17 will be in two forms, one form being in the form of a signal indicating that a binary one was stored in the line at that position and the other being a signal to indicate that a one was not stored. The signals are designated, for example, in the N bit position, by an N to indicate that a one was stored in the N position in the storage line and by an $\overline{\mathrm{N}}$ to indicate that a one was not stored in that position.

Associated with each bit position in the storage line and each output line is a gate which is adapted to selectively pass either the binary bit or its complement, to a further storage line 18 designated as a shift register. Each gate has two input gate legs, both of which must have a signal thereon in order to pass a signal to the output thereof. Buffered to each gate leg are a pair of input leads either of which if active will be effective to activate the associated gate leg. These gates may be of the type disclosed in an article by N. S. Zimbel, entitled "Packaged Logical Circuitry for a 4 mc. Computer," Convention Record of I.R.E., 1954 National Convention, Part IV, pages 133 to 139. A similar type of gating circuit is described in an article by F. R. Dean, entitled "Basic Gating Package for Computing Operations," Electronic Equipment, February 1956, pages 14–16.

For a storage line 17 having N bits of information therein, there will be provided N gates for selectively passing the information on the output lines of the storage line 17. These gates are adapted to supply a data signal to the further storage line 18 having at least N storage positions. This shift register may take any of several known types with a magnetic shift register presently finding wide application in this type of circuit. A suitable magnetic core register may be such as is described in an article by R. D. Kodis et al. entitled "Magnetic Shift Register Using One Core Per Bit," 1953 I.R.E. Convention Record, Part 7, Electronic Computers, pages 38–42. This shift register 18 is adapted to receive the information in parallel and may either transmit this information out in parallel to another register or transmit it out serially to some other register or a utilization device such as a transmitter or a recorder. The recorder which may be connected to the register 18 may be any type of digital data recorder well known in the art. One embodiment of the invention successfully used a magnetic recording system. A representative form of magnetic recording system will be found in a co-pending application of Kenneth E. Perry, entitled "Information Storage Record and Apparatus," bearing Serial Number 601,400, filed August 1, 1956.

An extra storage position designated $N+1$ is included in the register 18 and is used for storing an information bit to indicate whether or not information in the register 18 has been complemented. The bit for the $(N+1)$th position is supplied thereto by a gate 19. This $(N+1)$th storage position may be located at either end of the register 18.

For determining whether or not any complementing should take place, there is provided a binary one adder 20 which is adapted to produce an output when the number of ones passing into the adder exceeds by one, one-half of the total bits transferred into the line 17. This output signal may be designated as $N/2+1$.

When there is an output signal from the adder 20, there will be a signal applied to the complementing control circuit 21 which supplies the gating control signals for the gates 1 through N. If there is a call for a complementing of the information, the output line C will be active. If there has been no signal calling for the complementing of the information, the output line NC will be active. The output lines C and NC are buffered together with each of the outputs N and $\overline{\mathrm{N}}$ from the storage lines 17 on the input of each of the gates 1 through N.

In considering the operation of Figure 3, it is assumed that the data processor 15 is supplying information to the serial storage line 17 and that the information is represented by N bits. The adder 20 will count the number of ones passed through the coupling line 16. It is assumed first that the number of binary ones is less than one-half of the total bits transferred into the line. Under these conditions, the adder 20 will not have an output when the transfer into the line has been completed so that the complementing control circuit 21 will have an output voltage on its output line NC. This output voltage will be present on the line NC at the instant that it is desired to transfer the information from the storage line 17 into the shift register 18. With the NC line active and with a pulse stored in the number 1 position, a one will be passed through the gate 1 to the first storage position in the shift register 18.

A similar action will take place on each of the output lines of the storage line 17 at the same time. Thus, if at position N on the storage line 17 there is a zero, the $\overline{\mathrm{N}}$ line will be active with the NC line active. With both on the same gate leg, the gate N will not be open and there will be no signal transferred into the N position of the shift register 18. Similarly, in the $N+1$ position in the register 18, if the NC line of the complementing control circuit 21 is active, there will be no signal passed through the gate 19 to this $N+1$ position. Consequently, a zero will be stored in this position to indicate that the word in the register 18 has not been complemented.

If the information transferred from the data processor 15 to the storage line 17 had an excess of binary ones over binary zeroes by at least one, the adder circuit 20 will so indicate by producing an output signal which will be supplied to the complementing control circuit 21. The signal from the adder 20 supplied to the circuit 21 will make the output line C active and this signal will be in turn applied to each of the gates 1 through N connected between the storage line 17 and the register 18.

With the complementing control circuit having the output line C active, each of the buffer lines on the corresponding inputs of the gates 1 through N will be active. Considering first gate 1, if there is a one stored in the first position of thet storage line 17, this one will be applied to the buffer line connected to the same gate leg as the line C. Since this is on the same gate 1, the NC line will not be active and the line $\overline{1}$ will not be active, the gate 1 will remain closed so that nothing or a zero will be written into the first storage position in the register 18. A similar type gating will take place for each of the other storage positions in the storage line 17 wherein a one has been stored. It is assumed that there is a zero stored in the N bit position of the line 17 and under these conditions, it is desired to write a one into the N position of the register 18. With a zero in the N bit position, the output line $\overline{N}$ will be active and with the complementing control circuit line C active, both gate legs of the gate N will be active so that a pulse will be supplied to the N storage position of the register 18. This pulse will write a one into the storage position which will be the complement of the zero which was stored in the N position of the storage line 17.

Since the complementing control circuit 21 has an output C, this output will be passed through the gate 19 to the $(N+1)$th storage position. Since a pulse will be written into the $(N+1)$th position, this will repersent a one and will indicate that the data in the register 18 has been complemented. The complement indicator will be transferred with the information to the transmitter or rerecorder or to some other register to indicate that the information has been complemented. When the information is used, this bit position will be examined to see whether the information was complemented or not.

Figure 4 shows in detail a more complete logical circuit schematic for the adder and the complementing control circuit which may be used in the present invention and which comprised the blocks 20 and 21 of Figure 3. It will be readily apparent that there are numerous types of circuits adaptable for use in this general circuit and the circuit of Figure 4 is shown only by way of example.

The adder circuit shown by way of example in Figure 4 is a five stage adder of the serial binary type adapted to add the number of binary ones received on the input line IN. The adder notation is conventional binary notation in that the first stage having a one therein carries a decimal value of $2^0$ or a 1. The second stage of the adder having a one therein carries a value of $2^1$ or 2. The third stage having a one therein carries a decimal value of $2^2$ or 4. The fourth stage having a one therein carries a decimal value of $2^3$ or 8 while the fifth stage having a one therein carries a decimal value of $2^4$ or 16. The maximum number that can be indicated by a five stage counter will be 31 when there is a one in each stage. In the binary form, the decimal number 31 will appear as 11111.

Each stage of the counter shown in Figure 4 is formed of a dynamic type circuit which is adapted to be put into oscillation when there is a one therein and out of oscillation when there is a zero. In functioning as an adder, when any stage is not oscillating, or has a zero therein, the application of a one to the input of a stage will put the stage in a state of oscillation. When the stage is oscillating, having a one therein, the application of another one to the input will cause the stage to go out of oscillation and a one carry pulse will be propagated to the next stage in the series.

More specifically, the first adder stage 30 comprises a set gate 31 through which a set pulse is applied to store a one in the stage prior to the count. Adder stage 30 also includes a recirculation gate 32 and a hold gate 33. The recirculation gate 32 has a pair of input gate legs 34 and 35. The gate leg 34 has buffered thereto the input line IN and a recirculation line signal $A_1$ which is the output line for thte stage adapted to have an assertion signal thereon when any one of the gates 31, 32 or 33 passes a signal therethrough. The gate leg 35 has buffered thereto the $\overline{IN}$ signal from the input and a recirculation from the output negation of the stage designated $\overline{A_1}$. In this type of circuit or stage, when there is an output pulse $A_1$, at the instant that the $A_1$ pulse appears there will be no output on the line $\overline{A_1}$. When the $A_1$ pulse is not present, the $\overline{A_1}$ will be up or active so that it will open associated gating circuitry if the other gate legs associated therewith are active.

In order for the gate 32 to pass a signal, it is necessary that there be a signal on both of the input gate legs 34 and 35. This will occur when there is an input on one or the other of the buffer lines on each of the gate legs. The assertion signal $A_1$ is adapted to be passed through a delay line 36 to the second stage 37. The negation signal $\overline{A_1}$ is adapted to be passed through a delay line 38 to the second adder stage 37. When a pulse is applied to any of the input gates of the stage 30, it will appear on the output line one pulse period later and if this pulse is fed back to the input for recirculation, it will again appear on the output a pulse period after it was fed back to the input. There is a single pulse period of delay in each of the delay lines 36 and 38 which corresponds to the periods between oscillation pulse. The reason for selecting a single pulse period will be readily apparent upon considering the operation of the adder to be discussed below.

The stage 37 comprises a pair of gates 39 and 40. The gate 39 is the set gate for the adder stage 37 while the gate 40 is the recirculation gate. This stage has an assertion output $A_2$ and a negation output $\overline{A_2}$. The assertion output $A_2$ is adapted to be delayed by a one pulse period delay line 41 while the negation output $\overline{A_2}$ is adapted to be delayed by a delay line 42.

The third adder stage 44 comprises a pair of gates 45 and 46. The gate 45 is the set gate for the stage and the gate 46 is the recirculation gate for the adder stage. The assertion output $A_4$ of this stage is adapted to be passed through a delay line 47 while the negation output $\overline{A_4}$ is adapted to be passed through a delay line 48.

The fourth adder stage 50 comprises a pair of gates 51 and 52 having a plurality of input gate legs with the gate 51 acting as a set gate for the stage and the gate 52 acting as the recirculation gate for the stage. The output assertion line $A_8$ is adapted to be delayed by a delay line 53.

The fifth stage 55 also comprises a pair of gates 56 and 57, the gate 56 forming the set gate for the stage 55 and the gate 57 serving as the recirculation gate for the stage 55. As with the other stages, this stage also has an assertion output $A_{16}$ and a negation output $\overline{A_{16}}$.

The complementing control circuit comprises two separate gating structures 60 and 61. The gate 60 is adapted to produce an output pulse when each of the input gate legs are active. The gate 61 is adapted to produce an output at all times except at the time when a pulse is passed therethrough from the input gate legs.

Considering the operation of the adder and complementing control circuits of Figure 4 it is first assumed that the information transferred is represented by fifty-two binary bits. From this assumption, it will be apparent that if there are twenty-seven 1's transferred, out of the fifty-two bits, it is desired that the information transferred be complemented. Thus, if the adder counts twenty-seven pulses, it is desired that an output signal be present which will indicate that the information is to be complemented and, if used in the circuit shown in Figure 3, will actually co-operate with the gating circuitry for complementing the information transfer.

From the standpoint of convenience, the design of the adder is so arranged that it has a one inserted in the first stage of the adder before any counting takes place. Thus, if twenty-seven subsequent ones are received at the first counter stage, the actual count of the over-all adder circuit will be twenty-eight. When there is this twenty-eight count on the output leads of the adder, the associated component control circuit will be operative to produce a control signal which will effect the desired complementing of the information.

When it is desired to set the adder into its initial state, it is necessary to clear all of the stages and insert a one in the first stage 30. A one will be inserted in the stage 30 by a set pulse passed through the gate 31. At the same time that the set pulse is applied to the gate 31, the gate 40 will have a negation reset pulse applied thereto which will deactivate the recirculation through the gate 40 to thereby set the second adder stage 37 in the zero state. At the same time, the gate 46 has a reset negation pulse applied thereto so that the recirculation through the gate 46 will be stopped if there was a one stored in the stage and this stage will now be set in the zero state. In order to prevent the adder stage 44 from being set by a pulse propagated from the stage 37 during this resetting operation, the reset negation pulse delayed one pulse period is applied to the gate 45.

The fourth adder section 50 is also adapted to be reset into the zero state by the application of the reset negation pulse on the recirculation gate 52 and held there by the reset negation pulse, delayed one pulse period, applied to the input gate 51.

Similarly, the fifth adder stage 55 will be reset by the application of a reset negation pulse on the gate 57 to stop the recirculation through this gate and a reset negation pulse, delayed one pulse period, to the input set gate 56.

As thus far described, the adder of Figure 4 is now conditioned for the transfer of information so that the binary ones on the input will be added. The number in the adder may be designated as a binary 00001.

Insofar as the input to the adder circuit is concerned, when there is a one on the transfer line there will be a pulse fed in on the input line IN. At all other times, the input line $\overline{IN}$ will be active. When the in pulse is received, the input line $\overline{IN}$ will be down and the associated buffer line will not be conditioned to pass a signal through the gate 35 unless here is a recirculation pulse on the output negation $\overline{A_1}$.

As soon as the first input pulse is received on the input line IN, with the adder stage 30 having a one already present therein, it is desired that the stage 30 be set to the zero state and that a one be transferred to the second adder stage 37. With a one circulating in the stage, the negation line $\overline{A_1}$ will be inactive and at the same time the line $\overline{IN}$ will not be active so that the gate leg 35 will be closed. This will mean that the gate 32 will not pass any input pulse and one pulse period later the $\overline{A_1}$ line will be active indicating this stage is in the zero state. Since there was a pulse initially circulating in the stage, this pulse will be supplied through the delay line 36 and will appear one pulse period later as $A_1{}^1$ on input of the gate 39. At the same time, the line $\overline{A_1}$ will be active due to the fact that the stage 30 is now in the zero state so that the second gate leg $\overline{A_1}$ will be active. Since at the time of the read in into the second stage 37 this stage is in the zero state, its output line $\overline{A_2}$ will be active and therefore the gate 39 will be open to pass the $A_1{}^1$ pulse through the gate and set the stage 37 into the one state. The adder circuit will now read 00010 indicating a decimal count of two.

As soon as another one is received as indicated by a pulse on the input line IN, the pulse will be passed to the gate leg 34 and since the negation line $\overline{A_1}$ is active, the gate leg 35 will be active and the in pulse will pass through the gate 32 to set the first stage 30 back into the one state. It will continue to operate in this one state until such time as another 1 is received. As soon as another 1 is received, this 1 will drive the stage 30 into the zero state and transfer another 1 to the stage 37 in the aforedescribed manner. Since there is already a one stored in the stage 37, the application of a second one thereto by the stage 30 will be effective to set this stage in the zero state and transfer a one to the third stage 44. When this one is received at the stage 44, this stage will start oscillating or recirculating the signal to indicate a 1 is stored therein. The stage 37 will remain set in the zero state due to the fact that the recirculation gate 40 will be closed. The reason the gate will be closed will be readily apparent when it is noted that with the $A_1$ line down and the $\overline{A_1{}^1}$ line down, the gate 40 will be closed at the time that a recirculation pulse would normally be applied from the output of the stage 37 as $A_2$. Since the $A_2$ pulse can not recirculate, the stage 37 will become inactive and remain in the inactive state until such time as a subsequent pulse is received.

As soon as the next 1 is received on the input line IN, the stage 30 will again be set into the recirculating state indicating that a 1 is present. When the next input pulse is received on input line IN, this will set the stage 30 into the zero state and a 1 will be transferred into the stage 37. The next 1 received will then set the stage 30 in the one condition so that now stages 30, 37, and 44 are each in the one or recirculating state. The application of a subsequent 1 will have the effect of changing each of the stages 30, 37 and 44 to the zero state and propagating a one pulse into the stage 50.

With a zero stored in each of the stages 30, 37, and 44 and a one stored in the stage 50, the actual count of the adder will be eight, or expressed as binary number 01000. It will be seen that since a one was stored in the stage 30 before any counting took place, that when the eighth position has been reached, there has actually been received seven input pulses.

This propogation of the input one pulses will proceed through the adder until such time as the desired count has been reached. The desired count under the presently assumed conditions is the count when twenty-seven input pulses have been received or the counter reads twenty-eight. In binary terms the counter when reading a decimal twenty-eight will be 11100.

When each of the stages 44, 50, and 55 has an output one stored therein, the output assertion lines $A_4$, $A_8$, and $A_{16}$ will be active and will be effective to supply a pulse to the input gate legs of the gate 33 of the first stage 30. This will set the stage 30 in the 1 state and will have the effect of holding the stage in the 1 state thereby preventing further input pulses on input line IN from changing the adder setting. In this way, the counter, once having reached the condition indicating that a complementing will produce a time saving, will lock the adder in the next binary position to prevent any further change. This will be held until such time as a reset signal is applied to the adder and reset for the next information transfer.

If there is a one stored in each of the stages 44, 50 and 55 indicating that a twenty-eight count has been reached, it is desired that an output signal be produced which may be used to operate complementing circuitry, such as shown in Figure 3, to complement the information that is transferred. To accomplish this, the assertions from stages 44, 50, and 55 are applied to the gate 60 as input pulses $A_4$, $A_8$ and $A_{16}$. At the appropriate instant after the information has been read into the serial storage line, such as the line 17 in Figure 3, the information is to be transferred to the register 18, a transfer pulse TR will occur. At that time, the transfer TR pulse is applied to the gate 60 so that the gate 60 will open and a signal calling for the complement of the information will be transmitted by the gate for use with the gate circuits shown in Figure 3.

If the adder did not count up to twenty-eight pulses by the time the information has been transferred into the storage line, the adder stages 44, 50, or 55 will have an output negation such as $\overline{A_4}$, $\overline{A_8}$, or $\overline{A_{16}}$ which will activate one of the gate legs of the gate 61. At the instant that the transfer pulse is received indicating a transfer is to be made from the serial storage line to the shift register, there will be a pulse produced on the output of the gate as NC. This no-complement pulse NC will be applied to the gate inputs of the gates shown in Figure 3 to transfer the information without complementing to the shift register 18.

Figure 5:
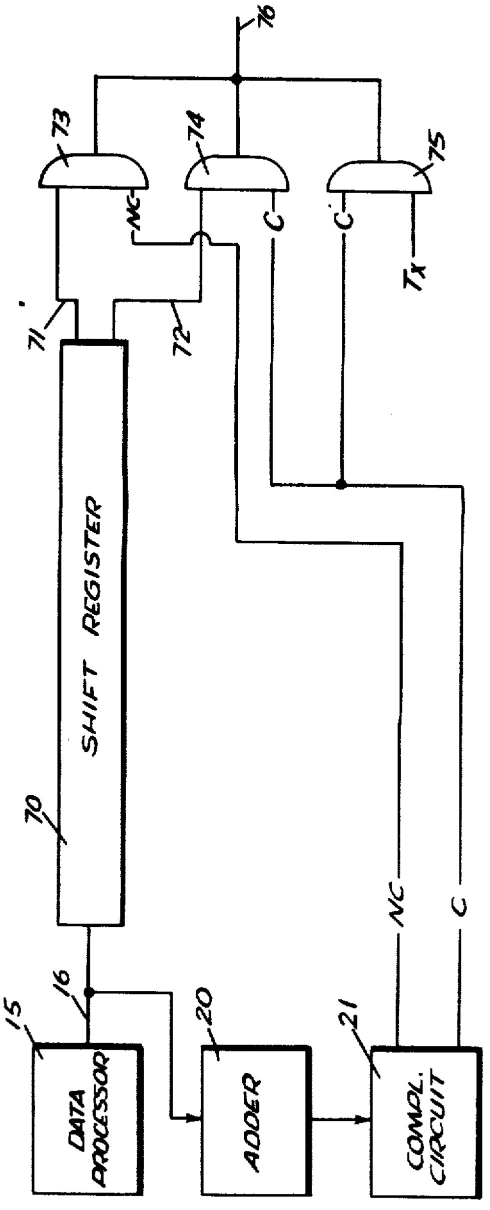
Figure 5 shows a modified form of complementing apparatus.

Figure 5 shows a modification of the principles set forth in Figure 3. In Figure 5, the components corresponding to those in Figure 3 carry corresponding reference characters. Added to Figure 5 on the output of the data processor 15 is a shift register 70. This shift register is adapted to have two output signals, one of which is the information in its normal form on output line 71, and the other in its complemented form on output line 72.

The output line 71 of the shift register 70 is applied to a gating circuit 73. The output line 72 which carries the complementing bit is connected to a gate 74. The gate 73 also has connected thereto a no-complement input line or gate leg NC. The gate 74 has connected thereto an input gate leg C which is operative when there is to be complementing of the information. A third gate 75 is provided on the output of the register and this gate has two inputs, one from the complementing circuit 21 by way of its output line C and the other inut from a timing source which is suitably synchronized, by means not shown, with the information being transferred through the register 70.

The operation of the circuit of Figure 5 is basically the same as Figure 3. In other words, the output of the data processor will be a series of binary digits which are suitably scanned by the adder 20. The adder 20 will count the number of ones transferred into the shift register 70 and when there is a predetermined ratio of ones with respect to zeroes, the complementing control circuit will produce an output signal on the output line C indicating that the information fed into the register 70 should be complemented. If the adder 20 did not count the ones necessary to indicate the complementing was necessary, the output of the complementing circuit 21 on line NC will be active to indicate that no complementing is desired.

When the complementing line C is operative, the information coming out of the shift register on line 72 will be passed through the gate 74. Since the information on the line 72 is in the complemented form, the gate 74 will have an output which will feed the output line 76.

If the adder circuit has indicated that the binary ones in the information are less than necessary in order to effect the complementing, then the output line NC of the complementing circuit 21 will be active. When this line is active, the output line C will be inactive so that only the gate 73 will be open to pass the uncomplemented output of the register 70 appearing on the line 71. Thus the output on the line 76 will appear in the uncomplemented form.

The complementing circuit 21, once set, will remain that way until the information in the register 70 has been shifted out at which time it is reset preparing for another transmission.

The gate 75 may be timed to be operative to produce a control signal which is appended to the beginning or the end of the information transferred out of the register 70. If the indicator is to be appended to the information at the beginning, it is necessary that a signal be produced on the output of the gate 75 prior to the time that the information on the shift register 70 begins to appear on the output line 76. If the indicator is to be appended to the end of the information, the gate 75 must remain closed until such time as the last information from the register 70 has passed out on the line 76.

The particular form of the apparatus shown in Figure 5 is well adapted for use in telegraph signal work and the like where serial transmission is used extensively. This particular form of circuit involves less gating circuitry than is required in the circuitry of Figure 3 which is of advantage from the economic standpoint.

When the information transmitted by either of the circuits shown in Figures 3 or 5 is received, it will be readily apparent that the information may be examined to see if there is a complemented indicator bit or signal present with the information transferred. If there is such a signal present, an associated complementing circuit may be used to control suitably gating circuits of the type shown in Figure 5 wherein the information will be complemented if the complementing circuit has been set by the control indicator. If not set, the gating circuitry will not complement transferred information.

Figure 6:
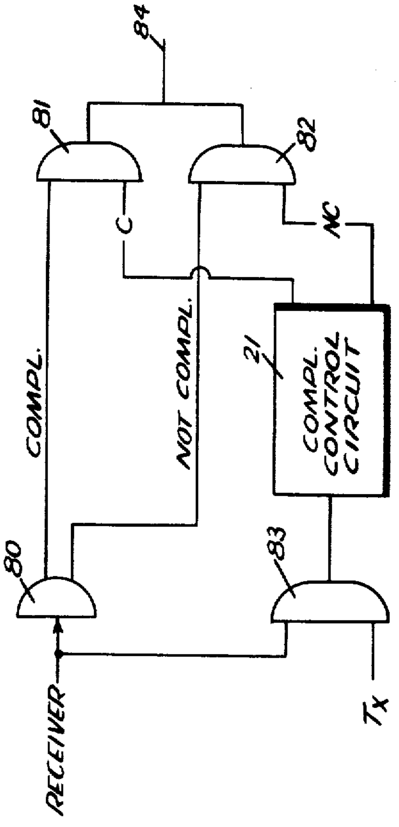
Figure 6 shows a diagrammatic circuit for receiving information which may have been modified on transmission.

The circuit in Figure 6 shows a representative form of apparatus for complementing the data received from a receiving apparatus after it has been transmitted. The apparatus in Figure 6 is arranged to complement the information if the information was complemented when it was transmitted. If it was not complemented when transmitted, the circuit of Figure 6 is adapted to pass the information without complementing.

The circuit of Figure 6 comprises an input circuit 80 having an output which is adapted to produce the information in complemented or non-complemented form. This circuit has two outputs, the complemented output being connected to a gate 81 and a non-complemented output being connected to a non-complement gate 82. The gate 81 includes an additional gate leg which has a control signal derived from a complemented control circuit 21 which may be of the same general type set forth in Figure 3. The gate 82 has a non-complementing output signal from the control circuit 81 connected as one of the gate legs thereto.

In order to actuate the complementing control circuit, there is provided an additional gating circuit 83 which is adapted to scan the input signal from the receiver and at a selected time $T_x$, the gate 83 will open and set the complementing control circuit 21 if there was an indicator indicating a complement was transmitted. After the control circuit has been set the output line C will be active and the gate 81 will open so that the complemented information from the circuit 80 will pass through the output line 84.

If no pulse was transmitted through the gate 83 at time $T_x$, the complementing control signal will not be set and the output line NC will be operative so that the gate 82 will pass the data in its non-complemented form to the output line 84.

In the apparatus shown in Figure 6, it is assumed that the indicator is appended to the information at the first part thereof and that the timing signal $T_x$ is generated by a suitable means, not shown, which is actuated at the time that the information has started to come in to the receiver.

When the principles of the present invention are utilized in the complementing of transferred information, there are present a number of additional advantages in addition to the potential space and time saving. Included in these is the factor of how much power is required in transmitting a certain piece of information. In other words, in transmitting a dot-dash signal the duty cycle for a dot is considerably less than the duty cycle for a dash. Consequently the complementing of the information so that there are more dots than dashes will reduce the over-all duty cycle of the associated transmitting apparatus.

In a shift register of the magnetic core type, such as may be used in the circuitry of Figures 3 and 5, the complementing of the information can reduce the total amount of power required for operating the shift register. In other words, more power is required to shift a magnetic shift register when each of the register positions has a one stored therein. However, if there are more zeroes than ones stored in the register, the power required will be considerably less. Consequently, it becomes economically practical to complement information when power considerations are taken into account in a shift register.

The principles of the present invention are also applicable to the transmission of information other than digital information. For example, a video signal for a television circuit may be suitably scanned and modified to improve the transmission of the video signal after which it is modified back to its initial form.

It will be readily apparent from the foregoing that the present specification has disclosed an apparatus whereby information is scanned during its transmission and the information is modified to increase the efficiency of the associated circuitry. Further, the apparatus shown produces an indicator indicating that the information has been modified and this indicator is adapted for use in remodifying the information back to its original form.

While, in accordance with the provisions of the statutes, there has been illustrated and described the best form of the invention known, it will be apparent to those skilled in the art that changes may be made in the form of the apparatus disclosed without departing from the spirit of the invention as set forth in the appended claims, and that in some cases, certain features of the invention may be used to advantage without a corresponding use of other features.

What is claimed is:

1. A binary data recording circuit comprising a recording means adapted to be supplied with binary data signals to be recorded, a binary data signal complementing means connected to said recording means, and a control circuit for said complementing means adapted to render said complementing means operative when the ratio of binary "ones" and "zeroes" in the data signals to be recorded is within a predetermined range of values, said control circuit comprising a counter means adapted to count at least the binary data in one of its two senses.

2. A binary data signal recording circuit comprising a recording means adapted to be supplied with binary data signals to be recorded, a binary data signal complementing means connected to said recording means, an adder circuit adapted to indicate the ratio of binary ones and zeroes in the data signals to be recorded, and means including said adder connected to said complementing means to count the binary data bits of one sense in said signals and to actuate said complementing means when the ratio of binary ones and zeroes is greater than a predetermined amount.

3. In a data transmission apparatus using two character code signals where one character signal is of a time length greater than the other, the combination comprising a character signal complementing circuit, and a selected character signal adder circuit connected to said character signal complementing circuit to actuate said complementing circuit when the count of said adder circuit exceeds a predetermined number.

4. A binary data signal transmission apparatus comprising a binary data signal complementing means, binary data signal sensing means adapted to actuate said complementing means when the ratio of binary ones to zeroes is in a predetermined range of values, and a complementing indicator generator circuit connected to said transmission apparatus so that when said data signals are complemented, an indicator signal is transmitted with the data signals.

5. A data transmission apparatus for transmitting N digit signals each represented by one of two distinctive characters comprising a selected character signal sensing means connected to said transmission apparatus and being adapted to produce an output signal when the number of the selected characters transmitted exceeds $N/2$, a character signal complementing circuit connected to said transmission apparatus, and means including said character signal sensing means connected to said complementing signal circuit to actuate said circuit when there is an output signal from said sensing circuit.

6. In a data transfer apparatus for binary digit signals where the binary digit signals are characterized by representations having different time lengths, the combination comprising a serial information storage line having an input and a plurality of outputs arranged so that the data signals may be shifted out of said storage line in a parallel manner, a second storage line having a plurality of inputs adapted to be connected to the outputs of said serial storage line, a serial adder connected to the input of said serial information storage line to add the number of digit signals of a predetermined type of representation, and means including said adder connected to complement the data signals transferred from said serial information storage line to said second storage line.

7. In a data transfer apparatus for binary digit signals where the binary digits are characterized by signal representations having different time lengths, the combination comprising a serial information storage line having an input and a plurality of outputs arranged so that the data signals may be shifted out of said storage line in a parallel manner, a second storage line having a plurality of inputs adapted to be connected to the outputs of said serial storage line, a separate gating circuit connected in series with each of the connections between the serial information storage line and said second storage line, said gating circuits being connected to transmit selectively in each connection the binary digit signal or its complement, a binary adder connected to said serial information storage line, and means including said adder connected to all of said gating circuits to effectively complement the data signals transferred from said serial information storage line and said second storage line when the adder indicates a predetermined number of one of the binary digit signals with respect to the other.

8. In a data transfer apparatus for binary digit signals where the binary digit signals are characterized by representations having different time lengths, the combination comprising a serial information storage line having an input and a plurality of outputs representing each digit signal and its complement arranged so that the data may be shifted out of said storage line, a separate gating circuit connected in series with each of the connections between the serial information storage line and said second storage line, said gating circuit being connected to transmit selectively in each connection the binary digit signal or its complement, in a parallel manner, a second storage line having a plurality of inputs adapted to be connected to the outputs of said serial storage line, a serial binary adder connected to the input of said serial information storage line, and means including said adder connected to complement the data signals transferred from said serial information storage line and said second storage line when the adder indicates a predetermined number of one binary digit signals with respect to the other.

9. In a data transfer apparatus for binary digit signals where the binary digit signals are characterized by representations having different time lengths, the combination comprising a serial information storage line having an input and a plurality of outputs representing each digit and its complement arranged so that the data signls may be shifted out of said storage line, a separate gating circuit connected in series with each of the connections between the serial information storage line and said second storage line, said gating circuit being adapted to transmit selectively in each connection the binary digit or its complement, in a parallel manner, a second storage line having a plurality of inputs adapted to be connected to the outputs of said serial storage line, a serial binary adder connected to the input of said serial information storage line, means including said adder connected to complement the data signals transferred from said serial information storage line to said second storage line when the adder indicates the number of one binary digit with respect to the other is within a predetermined range, and means adding to said second storage line a binary digit indicative of the presence or absence of complemented data signals in said second storage line.

10. In a data transmission apparatus using a two character code where one character is a signal of a time length greater than the other, the combination comprising a character complementing circuit, a complementing indicator detector connected to said apparatus to produce an indication signal when the number of a selected type of character code is greater than a predetermined amount, and means connecting said character complementing detector to said character complementing circuit to effect a complementing of the data signals transferred when said indicator circuit is operative.

11. In an information transfer apparatus for a signal having appended thereto an indicator signal indicative of whether or not the signal was modified upon transmission, the combination comprising an indicator signal sensing means, a signal modifier connected to said transfer apparatus to have the transferred signal pass therethrough, and means including said indicator signal sensing means connected to said signal modifier to actuate said modifier to remodify the signal to its initial form when the signal was modified upon transmission.

12. Apparatus for recording binary data signals comprising a binary data signal sensing means, sensing means for sensing data bits of one sense and producing an indication of the number of bits in that one sense, a storage circuit for the binary data signals, a data signal recording element connected to be energized by the data signals in said storage circuit, and means including said sensing means connected to said storage circuit to complement the stored binary data signals when there is a predominance of one of the binary digits with respect to the other sensed by said sensing means.

13. Apparatus for reducing the record space required on a record medium for a plurality of data bit signals comprising a recording means, circuit means connected to said recording means to supply the data bit signals thereto, signal complementing means connected to said circuit means, and a data bit signal sensing means for counting the data bits of one type supplied to said circuit means and being connected to said complementing means to complement the data signals when there is a greater number of one type of bit signal with respect to the other.

14. A binary data signal transmission appartaus comprising a binary data signal complementing means, and binary data signal sensing means connected to actuate said complementing means when the ratio of binary ones to zeroes is within a predetermined range of values, said sensing means comprising a counter connected to be activated by the binary signals in one sense.

15. In a data transfer apparatus for binary digit signals where the binary digit signals are characterized by representations having different time lengths, the combination comprising a serial information storage line having an input and a plurality of outputs arranged so that the data signals may be shifted out of said storage line in a parallel manner, a second storage line having a plurality of inputs selectively connected to the outputs of said serial storage line, an adder connected to said serial information line for counting the number of digit signals of a first time length, and means including said adder connected to complement the data signals transferred from said serial information storage line to said second storage line.

16. A binary data transmission apparatus comprising a binary data signal complementing means, binary data signal sensing means for sensing all of the data transferred and connected to actuate said complementing means when there is a preselected ratio of binary ones to zeroes, and means connected to said transmission apparatus for adding to said binary data signals a representation indicating said data signals have been complemented.

17. In an informational signal transfer apparatus, the combination comprising an information scanning apparatus for scanning all of the information transferred by said apparatus, a signal modifier, means including said scanning apparatus connected to said signal modifier to modify the informational signals in accordance with the character of the information scanned, and means including said last named means connected to said transfer apparatus to generate a signal indicating that said data has been modified.

18. In an informational signal transfer apparatus, the combination comprising an information scanning apparatus for scanning all of the information transferred, a signal modifier, means including said scanning apparatus connected to said signal modifier to modify the information signal in accordance with the character of all of the information scanned, and means connected to said transfer apparatus producing a modification indicator signal transferred with the modified signal when the signal has been modified by said signal modifier.

References Cited in the file of this patent

UNITED STATES PATENTS 2,609,143 Stibitz ---------------- Sept. 2, 1952